US012600920B2

(12) United States Patent
Abrahmi

(10) Patent No.: US 12,600,920 B2
(45) Date of Patent: Apr. 14, 2026

(54) METHOD FOR THE SEPARATE EXTRACTION OF RICE BRAN OIL AND RICE BRAN WAXES

(71) Applicant: RB PROCESS SA, Vésenaz (CH)

(72) Inventor: Jérôme Abrahmi, Zug (CH)

(73) Assignee: RB PROCESS SA, Vésenaz (CH)

( * ) Notice: Subject to any disclaimer, the term of this patent is extended or adjusted under 35 U.S.C. 154(b) by 793 days.

(21) Appl. No.: 17/627,086

(22) PCT Filed: Jul. 17, 2020

(86) PCT No.: PCT/EP2020/070245
§ 371 (c)(1),
(2) Date: Jan. 13, 2022

(87) PCT Pub. No.: WO2021/009337
PCT Pub. Date: Jan. 21, 2021

(65) Prior Publication Data
US 2022/0267697 A1 Aug. 25, 2022

(30) Foreign Application Priority Data
Jul. 18, 2019 (EP) .................................... 19187069

(51) Int. Cl.
*C11B 1/10* (2006.01)

(52) U.S. Cl.
CPC .................................... *C11B 1/104* (2013.01)

(58) Field of Classification Search
CPC ...................................................... C11B 1/104
See application file for complete search history.

(56) References Cited

U.S. PATENT DOCUMENTS 4,824,570 A * 4/1989 Bethuel et al. ........ B01D 11/04 210/511
8,747,931 B2 6/2014 DeLine et al.

FOREIGN PATENT DOCUMENTS

CN 107964450 A 4/2018
TW 200911979 A 3/2009

OTHER PUBLICATIONS

Machine Translation of CN107964450A (Lin et al.) (Year: 2018).*
J. Agric. Food Chem. 1996, 44, 3033-3039 (Shen-2) (Year: 1996).*
CN 1079644450 A (Lin et al. IDS reference, English language machine translation) (Year: 2018).*
Shen et al.; "Pilot Scale Extraction and Fractionation of Rice Bran Oil Using Supercritical Carbon Dioxide;" Journal of Agricultural and Food Chemistry; 1997; pp. 4540-4544; vol. 45, No. 12.
Garcia et al.; "Supercritical Carbon Dioxide Extraction of Fatty and Waxy Material From Rice Bean;", Journal of the American Oil Chemists' Society (JAOCS); 1996; pp. 1127-1131; vol. 73, No. 9.
Kuk et al.; "Supercritical CO2 Extraction of Rice Bran;" Journal of the American Oil Chemists' Society (JAOCS); 1998; pp. 623-628; vol. 75, No. 5.

(Continued)

*Primary Examiner* — Amy C Bonaparte
*Assistant Examiner* — Derek Rhoades
(74) *Attorney, Agent, or Firm* — Oliff PLC

(57) ABSTRACT

A method for the separate extraction of rice bran oil and rice bran wax using supercritical $CO_2$ as extraction medium and including two separation steps involving different predetermined pressure and temperature conditions.

11 Claims, 2 Drawing Sheets

(56) References Cited

OTHER PUBLICATIONS

Sparks et al.; "Extraction of Rice Bran Oil Using Supercritical Carbon Dioxide and Propane;" JAOCS; 2006; pp. 885-891; vol. 83, No. 10.
Oct. 13, 2020 Search Report issued in International Patent Application No. PCT/EP2020/070245.
Oct. 13, 2020 Written Opinion of the International Searching Authority issued in International Patent Appliction No. PCT/EP2020/070245.

* cited by examiner

METHOD FOR THE SEPARATE EXTRACTION OF RICE BRAN OIL AND RICE BRAN WAXES

The present invention relates to a method for the separate extraction of rice bran oil and wax according to claim 1.

Rice bran is a by-product of the rice milling industries and contains 10-26% oil depending on the variety, milling process, and other agro-climatic conditions. Rice bran contains proteins, free fatty acids, glycerides, sterols, and polysaccharides. Recently, it has received some attention because of its unique health benefits that may be attributed to the nutritionally important compounds, such as tocopherols, tocotrienols, sterols and especially the unique antioxidant oryzanol, present in it.

Despite its high potential for use as applications in food, pharmaceutical, cosmetics and chemical industries, effective large-scale production of rice bran oil is limited due to the high costs involved with the extraction of the oil as compared to other vegetable oils.

Firstly, the rice bran from rice milling processes needs to undergo a stabilization process to inactivate the enzymes and inhibit lipid oxidation. This stabilization is essential to prevent the deterioration of fat and valuable bioactive compounds of the bran. For commercial extraction of the rice bran oil, solvent extraction using hexane is the most popular used conventional method these days. Apart from recovering triglycerides and sterols from rice bran oil the extraction process also aims at limiting the recovery of free fatty acid (FFA) in crude oil. Minimizing the FFA content in refined rice bran oil is essential to achieve good stability and colour quality, yet this task is difficult to achieve with a liquid extracting agent, such as hexane, because solubility for specific group components of oilseed lipids (such as FFA) cannot be controlled. In addition, the use of hexane has further drawbacks due to its flammability, toxicity and high temperature involved in the process resulting in some undesirable components in the oil as a result of oxidative deterioration, developments of rancid and off-flavour.

Efforts have thus been made by many researchers to explore different other nonconventional techniques for the oil extractions and utilization. Some of these methods such as supercritical carbon dioxide extraction, subcritical water extraction, enzyme-assisted, ultrasonic-assisted and microwave-assisted processes.

Sparks et al. 2006 (JAOCS, Vol. 83, No. 10) disclosed a method for small scale rice bran oil extraction using a batch of 40 g of rice bran and supercritical $CO_2$ as extraction medium at 20-30 MPa and 45-85° C. The oil is separated from the supercritical $CO_2$ by passing through a cyclone.

However, low yields and high costs have so far limited the use of these alternative extraction methods in the large scale production of rice bran oil.

An additional obstacle is that the primary product of all known extraction methods is a mixture of rice bran oil and waxes. In order to avoid turbidity in the final product, the waxes must be separated from the rice bran oil by means of cooling and filtration. Even though the rice bran wax that is obtained thereby as "waste material" has recently found increasing industrial application in itself, e.g. as a thickener, binding agent, plasticizer, cosmetics, coating and gelling agent, the dewaxing process of crude rice bran oil adds to the complexity and overall costs of rice bran oil production.

The problem solved by the present invention is thus to provide a method that allows for the separate production of rice bran oil and rice bran wax, whereby the extracted products are free from toxic residues, have high concentration of nutritionally valuable components and are obtainable in a yield comparable to the conventional techniques.

This problem is solved by the method according to claim 1. Preferred embodiments are subject to the dependent claims.

Specifically, the present invention provides a method that allows for the separate extraction of rice bran oil and rice bran wax from rice bran. The method comprises the steps of a) providing an extraction vessel containing rice bran and percolating supercritical $CO_2$ through the extraction vessel at an extraction pressure p1 within a range of 100 and 1000 bar and at an extraction temperature T1 within a range of 35° C. to 120° C. to obtain an extract comprising rice bran oil and rice bran wax solubilized in the supercritical $CO_2$; and b) transferring the supercritical $CO_2$ and the extract from step a) to a first separation vessel and precipitating a first product comprising rice bran oil from a remaining extract by reducing the extraction pressure p1 to a first separation pressure p2, and c) transferring supercritical $CO_2$ and the remaining extract from step b) to a second separation vessel and reducing the first separation pressure p2 to a second separation pressure p3 to precipitate a second product comprising rice bran wax from a gaseous $CO_2$.

In the context of the present application, the following definitions apply:

The term "first product" as used throughout this application refers to a precipitate from the extract (comprising inter alia rice bran oil and rice bran waxes in supercritical $CO_2$) at the extraction pressure p1 and the extraction temperature T1. Depending on the values of p1 and T1 the composition of the first product can vary but contains rice bran oil, preferably as a main component.

The term "supercritical $CO_2$" as used throughout this application refers to a fluid state of carbon dioxide where it is held at or above its critical temperature of 31° C. and critical pressure of 74 bar.

The term "rice bran" as used throughout this application refers to the hard-outer layers of a rice grain. It consists of the combined aleurone and pericarp. Along with germ, it is an integral part of whole grains, and is often produced as a by-product of milling in the production of refined grains.

The term "extraction vessel" as used throughout this application refers to a container that is high pressure resistant (above 1000 bar) and in which the supercritical $CO_2$ can be intermixed with the rice bran.

The inventors of the presented method have surprisingly found that rice bran oil and rice bran wax can be selectively separated from an extract comprising the two components in supercritical $CO_2$ as extraction medium by adjusting the temperature and pressure within specific ranges. For instance, by reducing the pressure to the first separation pressure p2 in step b) of the inventive method, a first product comprising rice bran oil can be precipitated from the extract laden supercritical $CO_2$, while at least most of the solubilized rice bran wax can be retained in the supercritical $CO_2$. Thereafter, a further reduction of the pressure to a second separation pressure p3 causes the supercritical $CO_2$ to change to gaseous $CO_2$ and a subsequent separation of a second product comprising rice bran wax of from the gaseous $CO_2$. Thus, the inventive method provides the benefit of a separate extraction of rice bran oil and rice bran wax.

Using carbon dioxide as a solvent is highly convenient thanks to its moderate critical pressure and temperature.

Moreover, carbon dioxide is a non-toxic inexpensive and environmentally friendly solvent.

In a preferred embodiment of the invention the extraction pressure p1 for the extraction step a) is within the range of 100 and 600 bar, preferably within the range of 150 to 600 bar, preferably 300 to 600 bar, and most preferably about 550 bar.

Preferably the extraction temperature T1 for the extraction step a) is within the range of 50° C. to 80° C., more preferably 55° C. to 65° C. and most preferably about 60° C.

Within the above-defined ranges for the extraction pressure p1 and the extraction temperature T1, an increased amount of rice bran oil and rice bran wax can be extracted from rice bran with supercritical $CO_2$.

In a preferred embodiment of the invention the first separation step b) is conducted at a first separation temperature T2 that is higher than the extraction temperature T1 of extraction step a).

Preferably said first separation temperature T2 is at least 65° C., more preferably within the range of 70° C. to 80° C. and most preferably about 75° C.

It was found that at a constant pressure, increasing the temperature decreases the solubility of solutes (i.e. the rice bran extract) because the density of the supercritical $CO_2$ decreases. For that reason, the temperature increase from the extraction temperature T1 to first separation temperature T2 causes the rice bran oil to condense and starts precipitation of the rice bran oil from the extract—which can then be collected as the first product.

In a preferred embodiment of the invention the first separation pressure p2 for the first separation step b) is set below 230 bar, preferably below 200 bar, more preferably within the range of 170 to 190 bar and most preferably to about 180 bar.

In the context of the present invention, it has surprisingly been found that reducing the extraction pressure p1 to the first separation pressure p2 allows for an effective separation of the first product containing rice bran oil from the extract.

Preferably the second separation pressure p3 for the second separation step c) is set below 73.8 bar, preferably below 65 bar and most preferably to about 60 bar.

The reduction of the second separation pressure p3 below 73.8 bar leads to a change of state of the $CO_2$ from supercritical to gaseous, which was found to facilitate precipitation of the second product.

In a preferred embodiment of the invention the second separation step c) is preferably conducted at a second separation temperature T3 that is lower than extraction temperature T1 of extraction step a).

Preferably said second separation temperature T3 is set below 70° C., preferably below 60° C., more preferably within the range of 45° C. to 55° C. and most preferably about 50° C.

The above temperature ranges for the second separation step lead to an increased yield of rice bran wax. Preferably, the reduction of pressure and temperature is achieved without the use of external energy, e.g. by means of simply opening a valve to decrease pressure, which in turn leads to a temperature reduction. Thereby, the energy consumption of the inventive process can be effectively reduced.

In a preferred embodiment of the invention the extraction step a) is conducted with a solvent/feed ratio within the range of 25 to 45, preferably 30 to 40 and most preferably about 36 to maximise the overall yield of rice bran oil and rice bran wax.

The term "solvent/feed ratio" as used throughout this application refers to a ratio of supercritical $CO_2$ and rice bran. For example, a solvent/feed ratio of 2 indicates that there is twice as much supercritical $CO_2$ than rice bran in the incubation vessel of step a).

In a preferred embodiment of the invention the process further includes a recovery step d) that is conducted after the second separation step c) and in which the temperature of the gaseous $CO_2$ is decreased to a recovery temperature T4, at which the gaseous $CO_2$ condenses to a liquid state. The recovery temperature T4 is preferably at most 30° C., preferably within the range of 20° C. to 30° C. and most preferably about 25° C.

Preferably, after the recovery step d), the pressure and the temperature of the liquid $CO_2$ is increased to extraction pressure p1 and extraction pressure T1, such that the liquid $CO_2$ is brought into supercritical state and can be re-used in extraction step a).

In an alternative preferred embodiment of the invention the gaseous $CO_2$ of step c) is brought directly to supercritical state at temperature T1 and pressure p1 and is reused in step a).

The invention will be further explained based on the attached figures. It will be understood that these figures are intended to describe illustrative embodiments of the invention and are not intended to limit the scope of the invention in any way.

Figure 1:
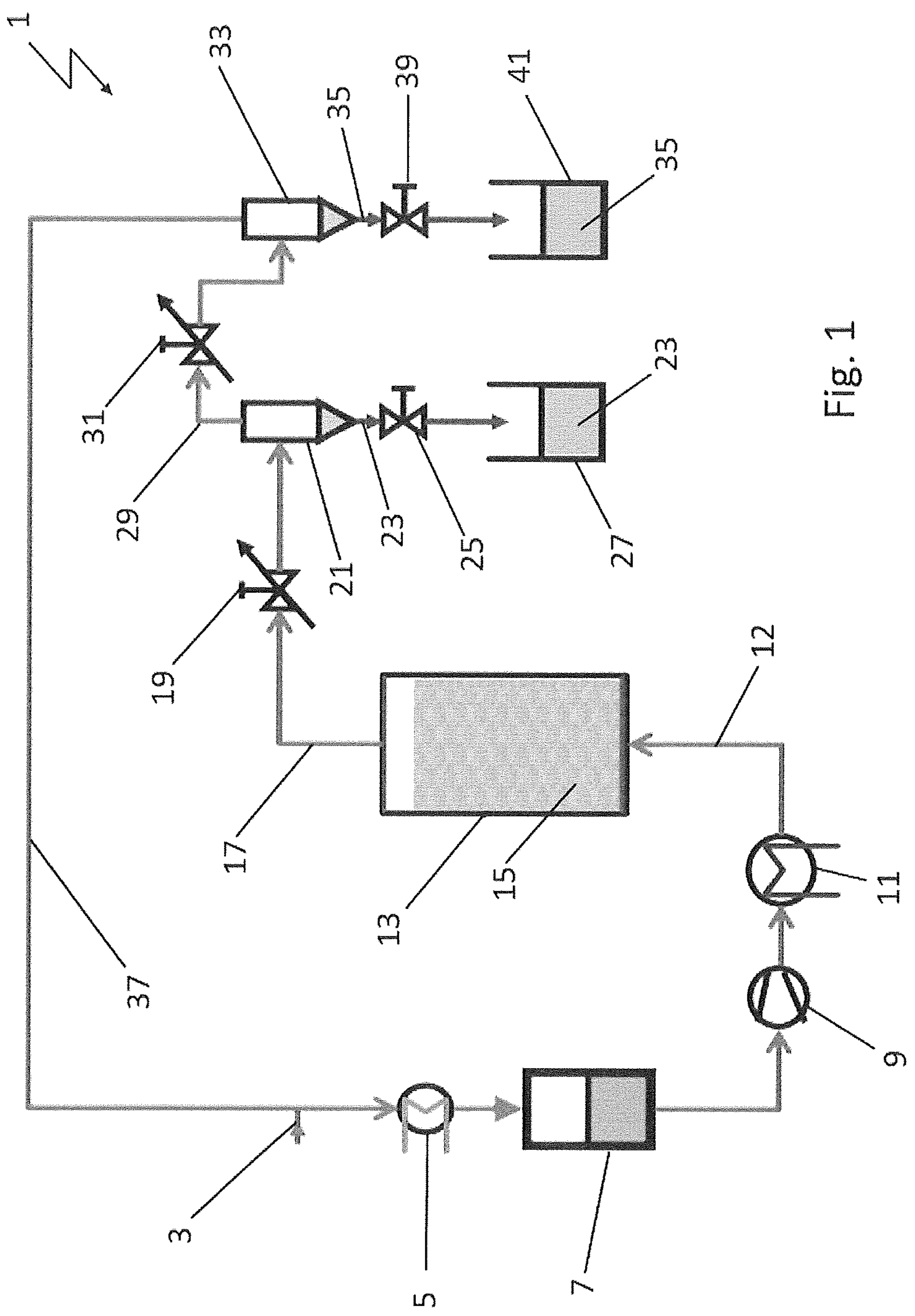
FIG. 1 shows a schematic drawing of the inventive process.

FIG. 1 shows a schematic representation of the inventive process 1, in which gaseous $CO_2$ 3 is introduced into the process 1 and brought to liquid state by reducing the temperature to a recovery temperature T4 at a first heat exchanger 5 and stored in a liquid $CO_2$ storage 7. Using a pump 9, the liquid $CO_2$ is transferred to a pressure regulated extraction vessel 13 comprising a stock of rice bran 15. Before or within the extraction vessel 13, the pressure is increased to an extraction pressure p1 by means of the pump 9 and the temperature is adjusted to an extraction temperature T1 by means of a second heat exchanger 11. The term "heat exchanger" is thereby to be understood in broad terms. For instance, the extraction vessel 13 can be positioned in a fluid bath (not shown) which during $CO_2$ loading is filled with a hot fluid to cause an increase in the temperature of the extraction vessel 13 and thus the $CO_2$ therein. By adjusting the temperature and pressure, the liquid $CO_2$ is brought into its supercritical state 12. The supercritical $CO_2$ is then percolated with the stock of rice bran 15 for a time sufficient to ensure impregnation of rice bran oil and rice bran wax in the supercritical $CO_2$, preferably for 1 to 4 hours. As a result, a rice bran extract 17 comprising rice bran oil and rice bran wax is thereby solubilized with the supercritical $CO_2$. The supercritical $CO_2$ loaded with rice bran extract 17 is then transferred through a first check valve 19 to a first separator 21, where the pressure p1 is reduced to a first separation pressure p2 and the temperature T1 is increased to the first separation temperature T2, e.g. by using a third heat exchanger (not shown). The decrease in pressure and increase in temperature causes precipitation of a first product 23, such that the first product 23 is separated from a mixture of supercritical $CO_2$ and remaining rice bran extract 29. The precipitated first product 23 is passed through a first valve 25 and collected in a first vessel 27. The mixture of supercritical $CO_2$ and remaining extract 29 is fed through a second check valve 31 to a second separator 33, where the pressure p2 is lowered to a second separation pressure p3 and the temperature T2 is decreased to a second separation temperature T3. For adjusting the temperature to the second separation temperature T3 a further heat exchanger (not shown) can be used. The decrease in the temperature and pressure in the second separator 33 causes the supercritical $CO_2$ to change into its gaseous state 37 and leads to precipitation of a second product 35 from the gaseous $CO_2$ 37. The second product 35 is passed through a second valve 39 and collected in a second vessel 41. The gaseous $CO_2$ 37 is transferred back to the first heat exchanger 5, at which the temperature can be decreased further to bring the gaseous $CO_2$ into liquid state for storage.

Figure 2:
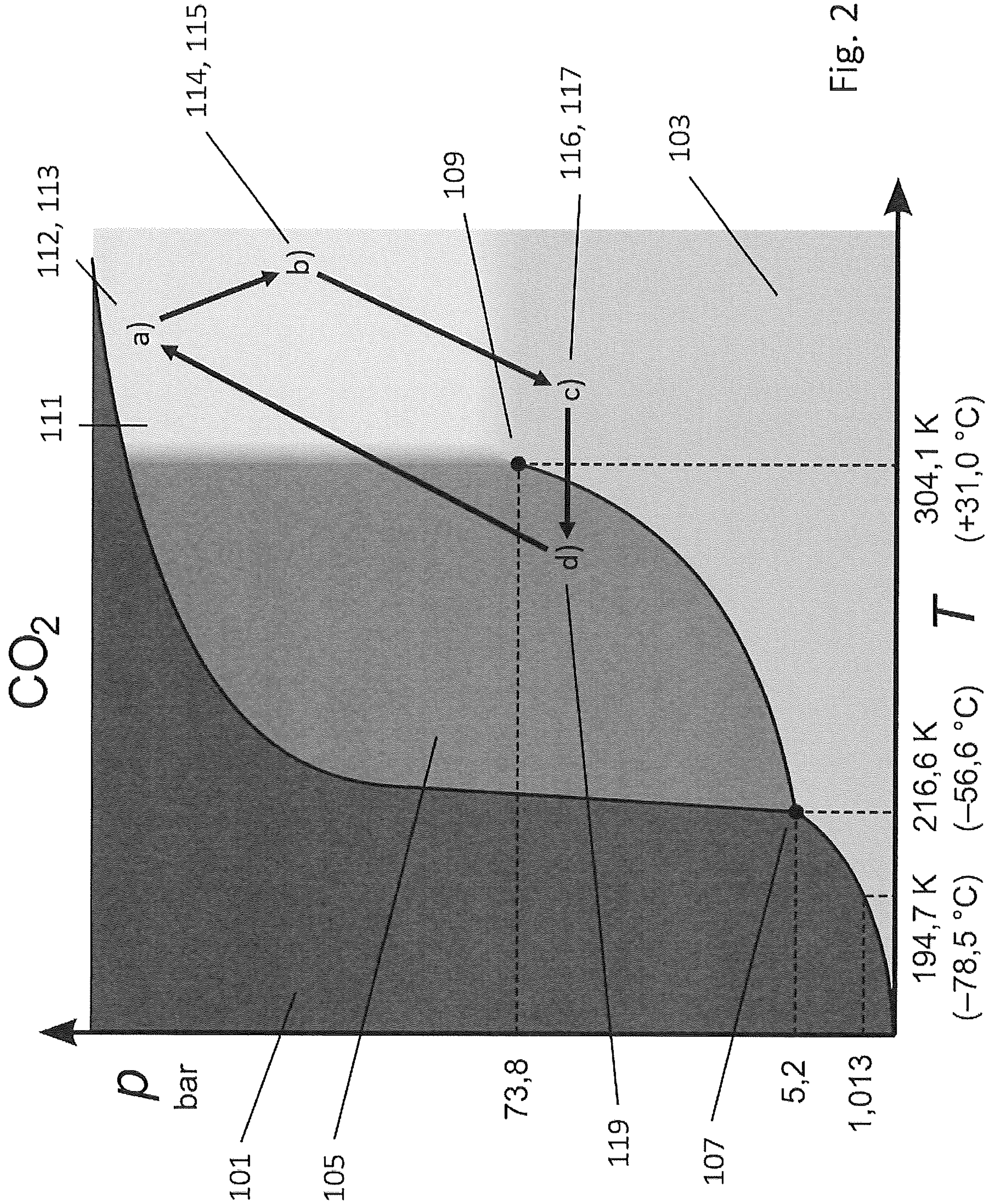
FIG. 2 shows a schematic graphic of the different states of the extraction medium $CO_2$.

FIG. 2 shows a schematic graph of the different states of $CO_2$ at different pressure and temperature conditions. At high pressure and low temperature, the $CO_2$ is in a solid state 101 known as dry ice. In contrast thereto, at low pressure and high temperature, $CO_2$ is in a gaseous state 103. Within a temperature range of −56.6° C. to 31.0° C. and a pressure above 5.2 bar $CO_2$ will predominantly be in a liquid state 105. To bring the $CO_2$ into its supercritical state 111, a pressure of at least 73.8 bar and a temperature of at least 31.0° C. is required.

The above changes of $CO_2$'s aggregation states are utilized in the method of the present invention: For the extraction step a) of the inventive process, $CO_2$ is brought to supercritical state 111 at the extraction pressure p1 112 and the extraction temperature T1 113. In the first separation step b), the pressure of the supercritical $CO_2$ 111 is lowered to the first separation pressure p2 and the temperature is increased to the first separation temperature T2 114, 115. During the second separation step c), the pressure and the temperature are lowered to the second separation pressure p3 and the second separation temperature T3 116, 117, respectively, at which the $CO_2$ changes to a gaseous state 103. In the recycling step d), the temperature of the gaseous $CO_2$ is further reduced to the recovery temperature T4 119, at which the $CO_2$ changes to a liquid state 105. The liquid $CO_2$ can then be reused for the extraction in the extraction step a) by increasing the temperature and pressure to the extraction pressure p1 and extraction temperature T1 112, 113, respectively, to bring the $CO_2$ into supercritical state 111 again.

Materials and Methods

Example 1

Extraction Process

Raw stabilized rice bran (10 kg from FortiBran® as FORTIVIA® N° 09-050-2019-22) was introduced in an extraction basket, then placed in an extractor. The extractor was pressurized to an extraction pressure p1 of 280 bar. Supercritical $CO_2$ (267 kg) was percolated through the raw rice bran in the extractor at the extraction pressure and at an extraction temperature T1 of 60° C. The solvent/feed ratio was 36.

In Example 1, the rice bran contained an initial oil/wax content of 15% oil and 3% waxes.

Separation Process:

The supercritical $CO_2$ and the extract solubilized therein were transferred to a first separation vessel. The pressure was reduced to a first separation pressure p2 of 180 bar and the temperature was increased to a first separation temperature T2 of 75° C. This caused rice bran oil to precipitate from the supercritical $CO_2$ and was collected at the bottom of the separation vessel.

The supercritical $CO_2$ and remaining extract were transferred to a second separation vessel and the pressure was reduced to a second separation pressure p3 of 60 bar and the temperature was reduced to a second separation temperature T3 of 50° C. At these conditions, rice bran wax precipitated (mostly in liquid state) from gaseous $CO_2$ and was collected at the bottom of the second separation vessel.

The first and second products comprising rice bran oil and rice bran wax were collected in separators in real time. After separation, water was removed from the precipitated products by decantation at 70° C.

Yields of rice bran oil were determined by gravimetry and other analytical methods including fatty acid titration.

Yield of the collected rice bran oil and rice bran wax after decantation and water removal was 15% and 3%, respectively. Total yield of rice bran oil and wax was thus 18%.

The conditions and yields of Example 1 are summarized in Table 1 below:

| Extraction Conditions | | | Separation Conditions | | Yield after water removal (decantation) | | |
|---|---|---|---|---|---|---|---|
| Pressure p1 (bar) | Temp. T1 (° C.) | Solvent/ Feed ratio | p2/T2 in 1st stage | p3/T3 in 2nd stage | | Yield after sep. stage | Total yield |
| 280 | 60 | 36 | 180 bar 75° C. | 60 bar 50° C. | 1st stage | 15% | 18% |
| | | | | | 2nd stage | 3% | |

Example 2—Low Pressure and Temperature Conditions

Material:

Raw stabilized rice bran (FortiBran®—long grain rice type A Rombo, stabilized by vapor at 8 bar during 30 seconds, (by FORTIVIA®)) was used as starting material.

Preliminary note: The contents of rice bran oil and wax can vary quite significantly. The rice bran used for Example 2 had the same rice bran oil content as the one used for Examples 1 and 3, namely 15%, yet the initial rice bran wax content was found to be significantly lower, namely merely 0.5% instead of 3%.

In Example 2, the extraction and separation steps were carried out the same way as for Example 1, yet with the conditions indicated in Table 2 below. The purpose of this Example 2 was to verify that a separate extraction of rice bran oil and rice bran wax was possible with a very low pressure and temperature. For this purpose, only a small fraction of rice bran oil was actually extracted and collected in the 1st separation stage. In the 2nd separation stage, it was tried to extract and separate as much rice bran wax as possible.

The conditions and yields of Example 2 are summarized in Table 2 below:

| Extraction Conditions | | | Separation Conditions | | Yield after water removal (decantation) | | |
|---|---|---|---|---|---|---|---|
| p1 [bar] | T1 [° C.] | Solvent/ Feed ratio | p2/T2 in 1st stage | p3/T3 in 2nd stage | | Yield after sep. stage | Total yield (**) |
| 100 | 35 | 25 | 90 bar 60° C. | 60 bar 60° C. | 1st stage | 0.55% (**) | 1.1% (**) |
| | | | | | 2nd stage | 0.45% | |

It was found that a separate extraction of rice bran oil and wax was possible under low pressure and temperature conditions (100 bar and 35° C.).

(**) While only a fraction of light rice bran oils was actually separated and collected during the first separation stage (0.55% of overall 15%), it could be verified that separation and extraction of essentially all rice bran wax contained in the raw rice bran was possible (0.45% of overall 0.5%).

Example 3—High Pressure and Temperature Conditions

Material:

Raw stabilized rice bran (from FortiBran® as FORTIVIA® N° 09-050-2019-22) was used as starting material (i.e. the same as in Example 1). The rice bran contained an initial oil/wax content of 15% oil and 3% waxes.

In Example 3, the extraction and separation steps were carried out same way as for Example 1, yet with the conditions indicated in Table 3 below.

The conditions and yields of Example 3 are summarized in Table 3 below:

| Extraction Conditions | | | Separation Conditions | | Yield after water removal (decantation) | | |
|---|---|---|---|---|---|---|---|
| p1 (bar) | T1 (° C.) | Solvent/ Feed ratio | p2/T2 in $1^{st}$ stage | p3/T3 in $2^{nd}$ stage | Yield after sep. stage | | Total yield |
| 550 | 80 | 12 | 250 bar 80° C. | 60 bar 50° C. | $1^{st}$ stage | 17% | 20% |
| | | | | | $2^{nd}$ stage | 3% | |

It was found that at high pressure and a smaller solvent/feed ratio, a higher overall extraction yield was obtained (total 20% instead of 18%). It is assumed that all rice bran oil and waxes were extracted, yet together with some other compounds that were not co-extracted at lower pressure. This assumption is based on the observance that rice bran oil was effectively collected during the 1st separation stage, together with some other compounds, inter alia pigments and polar lipids. All waxes were collected during the $2^{nd}$ separation stage.

The invention claimed is:

1. A method for the separate extraction of rice bran oil and rice bran wax with the following steps:

a) an extraction step involving provision of an extraction vessel containing rice bran and percolating supercritical $CO_2$ through the extraction vessel at an extraction pressure within the range of 500-600 bar and at an extraction temperature within the range of 50° C. to 80° C.;

b) a first separation step involving transferring the supercritical $CO_2$ and an extract comprising of oil and waxes from step a) to a first separation vessel and reducing the pressure to a first separation pressure that is lower than the extraction pressure to precipitate a first product comprising rice bran oil from supercritical $CO_2$; and c) a second separation step involving transferring supercritical $CO_2$ and the remaining extract from step b) to a second separation vessel and reducing the pressure to a second separation pressure that is lower than the first separation pressure to precipitate a second product comprising rice bran wax from gaseous $CO_2$, wherein the second separation step c) is conducted at a second separation temperature that is lower than the extraction temperature of extraction step a).

2. The method according to claim 1, wherein the first separation temperature is at least 65° C.

3. The method according to claim 1, wherein the first separation pressure for the first separation step b) is set below 230 bar.

4. The method according to claim 1, wherein the second separation pressure for the second separation step c) is set below 73.8 bar.

5. The method according to claim 1, wherein the second separation temperature is set below 70° C.

6. The method according to claim 1, wherein the extraction step a) is conducted with a solvent/feed ratio within the range of 25 to 45.

7. The method according to claim 1, further comprising a recovery step d), in which the temperature of the gaseous $CO_2$ after the second separation step c) is decreased to a recovery temperature at which the gaseous $CO_2$ changes to a liquid state.

8. The method according to claim 7, wherein the recovery temperature is at most 30° C.

9. The method according to claim 7, wherein after the recovery step d), the pressure and the temperature of the liquid $CO_2$ is increased to the extraction pressure and extraction temperature to change the state of the $CO_2$ to supercritical for re-use in extraction step a).

10. The method according to claim 1, wherein the extraction pressure for the extraction step a) is within the range of 550 and 600 bar.

11. The method according to claim 1, wherein the extraction pressure for the extraction step a) is within the range of 500 and 550 bar.

* * * * *